US010616348B2

(12) United States Patent
Bhatia et al.

(10) Patent No.: US 10,616,348 B2
(45) Date of Patent: Apr. 7, 2020

(54) SYSTEM AND METHOD FOR PROVIDING MULTIPLE IPMI SERIAL OVER LAN (SOL) SESSIONS IN MANAGEMENT CONTROLLER STACK

(71) Applicant: AMERICAN MEGATRENDS INTERNATIONAL, LLC, Norcross, GA (US)

(72) Inventors: Anurag Bhatia, Lilburn, GA (US); Yi-Wei Chiu, Taipei (TW); George Hsin, Taipei (TW); Ajay Kumar Gupta, Chennai (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 571 days.

(21) Appl. No.: 15/263,825

(22) Filed: Sep. 13, 2016

(65) Prior Publication Data
US 2018/0077245 A1 Mar. 15, 2018

(51) Int. Cl.
*H04L 29/08* (2006.01)
(52) U.S. Cl.
CPC .......... *H04L 67/142* (2013.01); *H04L 67/141* (2013.01)
(58) Field of Classification Search
CPC .......................... H04L 67/141; H04L 67/142
See application file for complete search history.

(56) References Cited

U.S. PATENT DOCUMENTS

| 2014/0344431 | A1* | 11/2014 | Hsu | H04L 41/044 |
| | | | | 709/223 |
| 2016/0246754 | A1* | 8/2016 | Rao | G06F 13/4286 |
| 2017/0171023 | A1* | 6/2017 | Chiu | H04L 41/0893 |
| 2018/0032470 | A1* | 2/2018 | Christopher | G06F 13/4282 |

\* cited by examiner

*Primary Examiner* — Austin J Moreau
(74) *Attorney, Agent, or Firm* — Locke Lord LLP; Tim Tingkang Xia, Esq.

(57) ABSTRACT

Systems and methods for providing and supporting multiple Intelligent Platform Management Interface (IPMI) serial over local area network (SOL) sessions in a management controller. The system includes a management controller used to manage multiple nodes, and at least one remote computing device connected to the management controller via a local area network (LAN). In operation, the management controller configures multiple serial ports for the nodes, so the management controller is communicatively connectable to each of the nodes respectively via one of the serial ports. When the management controller receives a SOL request from the remote computing device to establish a SOL session to access a specific node, the management controller may accordingly establish the SOL session between the specific node and the remote computing device sending the SOL request. Thus, the management controller may support multiple SOL sessions, and may store information of each of the SOL sessions independently.

20 Claims, 7 Drawing Sheets

SYSTEM AND METHOD FOR PROVIDING MULTIPLE IPMI SERIAL OVER LAN (SOL) SESSIONS IN MANAGEMENT CONTROLLER STACK

FIELD

The present disclosure relates generally to management controller and Intelligent Platform Management Interface (IPMI) technologies, and more particularly to systems and methods for providing and supporting multiple IPMI serial over LAN (SOL) sessions in an embedded management controller stack, such as a chassis management controller, a baseboard management controller (BMC), or a rack management controller.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the modern world information technology infrastructure, the capability requirement of network equipment is getting bigger. For example, in a server blade system, an embedded management controller (such as a chassis management controller or other management controllers) may be provided to manage the blades, servers or nodes of the system. In particular, the management controller may manage the flow of the IPMI data across a network to the one or more terminals that supports the IPMI specification. In some product design, hardware components such as network switches may be provided to enable the communication between the management controller and the nodes. However, this imposes additional challenges and limitations on the management controller to manage and communicate with multiple nodes.

Therefore, an unaddressed need exists in the art to address the aforementioned deficiencies and inadequacies.

SUMMARY

Certain aspects of the present disclosure relate to a system, including a management controller and at least one remote computing device communicatively connected to the management controller via a local area network (LAN). In certain embodiments, the management controller includes a processor and a non-volatile memory storing computer executable code. The computer executable code, when executed at the processor, is configured to: configure a plurality of serial ports for a plurality of nodes, wherein the management controller is communicatively connectable to each of the nodes respectively via one of the serial ports; receive, from one of the at least one remote computing device via the LAN, a serial over LAN (SOL) request to establish a SOL session to access a specific node of the nodes via one of the serial ports; in response to the SOL request, establish the SOL session between the specific node and the remote computing device sending the SOL request; and when a plurality of the SOL sessions is established between the at least one remote computing device and the plurality of nodes, store information of each of the SOL sessions independently.

In certain embodiments, the management controller is a chassis management controller, and each of the nodes is a blade server managed by the chassis management controller.

In certain embodiments, the management controller is a baseboard management controller (BMC), and each of the nodes is a processor or a controller of a host computing device communicatively connected to the BMC.

In certain embodiments, the serial ports are respectively configured under a universal asynchronous receiver/transmitter (UART) format. In certain embodiments, the serial ports include four UART ports, allowing the management controller to establish at most four of the SOL sessions concurrently.

In certain embodiments, the SOL request comprises information to identify one of the serial ports to be used for the SOL session, and the computer executable code is configured to establish the SOL session by: in response to receiving the SOL request, determining whether the serial port identified by the SOL request is available to establish the SOL session; and in response to determining the serial port to be available, establishing the SOL session using the serial port identified by the SOL request. In certain embodiments, the computer executable code is further configured to: in response to determining the serial port to be unavailable to establish the SOL session, send a denial message to the remote computing device sending the SOL request via the LAN.

In certain embodiments, the computer executable code is further configured to: in response to establishing the SOL session, receiving a SOL command from the remote computing device sending the SOL request via the LAN; and sending the SOL command to the specific node via the serial port used for the SOL session. In certain embodiments, the computer executable code is further configured to: receiving a SOL response from the specific node via the serial port used for the SOL session, wherein the specific node is configured to generate the SOL response in response to the SOL command; and sending the SOL response to the remote computing device sending the SOL request via the LAN.

Certain aspects of the present disclosure relate to a method for providing multiple Intelligent Platform Management Interface (IPMI) SOL sessions in a management controller. In certain embodiments, the method includes: configuring, by the management controller, a plurality of serial ports for a plurality of nodes, wherein the management controller is communicatively connectable to each of the nodes respectively via one of the serial ports; receiving, by the management controller from one of at least one remote computing device via a LAN, a SOL request to establish a SOL session to access a specific node of the nodes via one of the serial ports; in response to the SOL request, establishing, by the management controller, the SOL session between the specific node and the remote computing device sending the SOL request; and when a plurality of the SOL sessions is established between the at least one remote computing device and the plurality of nodes, storing, by the management controller, information of each of the SOL sessions independently.

In certain embodiments, the serial ports are respectively configured under a universal asynchronous receiver/transmitter (UART) format, and the serial ports include four UART ports, allowing the management controller to establish at most four of the SOL sessions concurrently.

In certain embodiments, the SOL request comprises information to identify one of the serial ports to be used for the SOL session, and the step of establishing the SOL session includes: in response to receiving the SOL request, determining whether the serial port identified by the SOL request is available to establish the SOL session; and in response to determining the serial port to be available, establishing the SOL session using the serial port identified by the SOL request.

In certain embodiments, the method further includes: in response to establishing the SOL session, receiving, by the management controller, a SOL command from the remote computing device sending the SOL request via the LAN; sending, by the management controller, the SOL command to the specific node via the serial port used for the SOL session; receiving, by the management controller, a SOL response from the specific node via the serial port used for the SOL session, wherein the specific node is configured to generate the SOL response in response to the SOL command; and sending, by the management controller, the SOL response to the remote computing device sending the SOL request via the LAN.

Certain aspects of the present disclosure relate to a non-transitory computer readable medium storing computer executable code. In certain embodiments, the computer executable code, when executed at a processor of a management controller, is configured to: configure a plurality of serial ports for a plurality of nodes, wherein the management controller is communicatively connectable to each of the nodes respectively via one of the serial ports; receive, from one of at least one remote computing device via a LAN, a SOL request to establish a SOL session to access a specific node of the nodes via one of the serial ports; in response to the SOL request, establish the SOL session between the specific node and the remote computing device sending the SOL request; and when a plurality of the SOL sessions is established between the at least one remote computing device and the plurality of nodes, store information of each of the SOL sessions independently.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
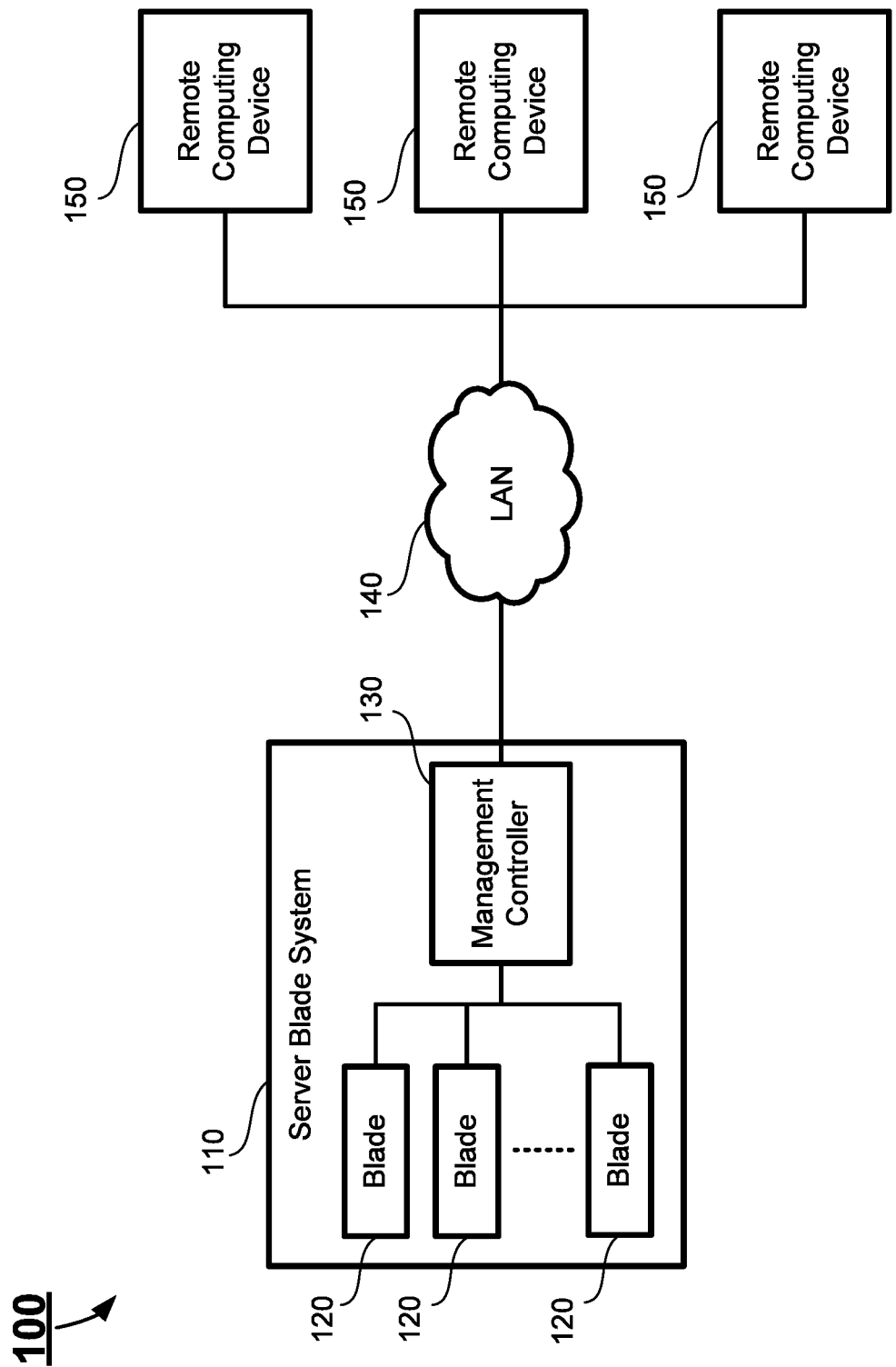
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an internet protocol (IP) address.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

The IPMI is an industry standard for system monitoring and event recovery, which include a set of computer interface specifications for an computer subsystem that provides management and monitoring capabilities independently of the hardware components of the host system. Currently, embedded management controller chips such as BMCs and chassis management controllers fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer.

As described above, in a server blade system, an embedded management controller (such as a chassis management controller or other management controllers) may be provided to manage the blades, servers or nodes of the system. In particular, each of the blades, servers or nodes is connected to the management controller via serial communications, such as the universal asynchronous receiver/transmitter (UART). UART is a computer hardware device that translates data between characters (usually bytes) in a computer and an asynchronous serial communication format that encapsulates those characters between start bits and stop bits. Thus, the management controller may manage the flow of the IPMI data across a network to the one or more terminals that supports the IPMI specification and capable of sending IPMI commands via the UARTs.

In a server blade system, the blades or servers may convert the host screen into a text format. The data is streaming between the UART port of the embedded management controller and the UART port of the blades or servers. When the management controller receives a IPMI SOL activate command request via the IPMI session, the management controller may redirect the text data into the session. After the IPMI tool of the management controller receives the text data in the terminal, the host screen will be completed to display in the terminal console.

However, in some occasions, the management controller is needed to manage the SOL connection for more than one blades or servers. The IPMI specification (e.g., IPMI v2.0) provides the port redirection function, but it requires that each SOL connection has one network port. Further, the existing IPMI application tools do not support the port redirection. Moreover, there is also a security concern because the more network ports are exported in public network, the risk of the network attack increases.

In certain embodiments, the embedded management controller may handle more than one SOL connections via the IPMI network port. This brings a few challenges and limitations:

A corresponding task needs to be developed and supported on the management controller stack for handling more than one SOL connections.

A corresponding driver needs to be developed and supported on the management controller stack for handling UART interrupt requests and reduces the system loading.

In accordance with the purposes of present disclosure, as embodied and broadly described herein, in certain aspects, the present disclosure relates to a system having a management controller to support multiple IPMI SOL sessions. In certain embodiments, the management controller may be, for example, a chassis management controller, a BMC, a rack management controller, or any other types of management controller that manage multiple nodes.

FIG. 1 schematically depicts a system according to certain embodiments of the present disclosure. As shown in FIG. 1, the system 100 includes a server blade system 110, which includes a plurality of blades 120 mounted on and enclosed by a chassis (not shown), and a management controller 130. In this case, the management controller 130 is a chassis management controller. Each of the blades 120 is respectively connected to the management controller 130 via a serial communication. It should be noted that the server blade system 110 may or may not include a network switch. Further, the system 100 may include a plurality of remote computing devices 150 respectively communicatively connected to the management controller 130 via a local area network (LAN) 140. The LAN 140 is an out-of-band (OOB) network for the management controller 130. In certain embodiments, the LAN 140 may be implemented as a wired or wireless network, and may be of various forms. In certain embodiments, in addition to the LAN 140, the management controller 130 may be connected to other networks, such as a wide area network (WAN) including the Internet, or any other type of networks.

The server blade system 110 is a computer system with a modular design, which may be optimized to minimize the use of physical space and energy. The chassis of the server blade system 110 is a supporting enclosure structure, where a plurality of components, including the blades 120 and other components, may be mounted thereon. In certain embodiments, the management controller 130 may be mounted within the chassis. In certain embodiments, the blades 120 and other components mounted on and enclosed by the chassis are managed by the management controller 130, and each of the blades 120 and other components managed by the management controller 130 is a node. In certain embodiments, each of the blades 120 may be a plate with all the functional components to be considered a computer, and the server blade system 110, with all the blades 120 being mounted on the chassis, constitutes and functions as a server system as a whole. In certain embodiments, each blade 120 functions as an independent blade server. In certain embodiments, the chassis may include a frame or other internal physical supporting structure on which the blades 120, circuit boards, plates, and other electronics of the server blade system 110 may be mounted.

The management controller 130 is a controller for managing the components or nodes of the blade server system 110, including the blades 120 and other components. In certain embodiments, the management controller 130 may be a chassis management controller for monitor the operation of the components or nodes (e.g., the blades 120) of the server blade system 110. In certain embodiments, the system 100 may include multiple management controllers 130, and each of the management controllers 130 may be used to respectively manage some or all of the components or nodes of the blade server system 110.

Figure 2:
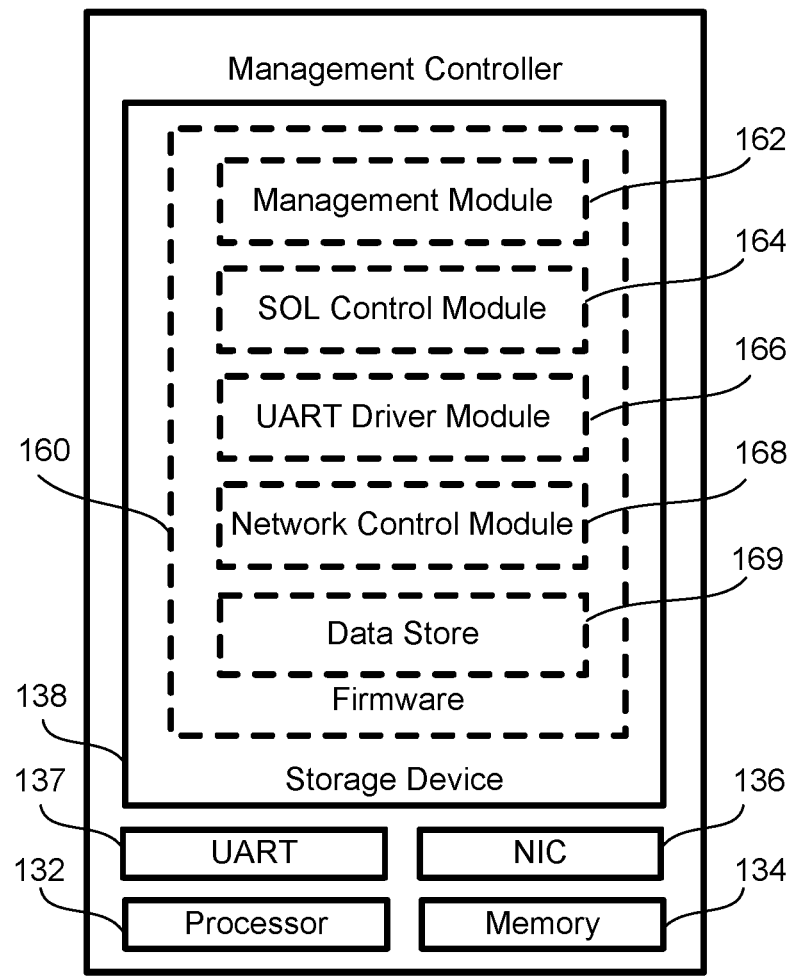
FIG. 2 schematically depicts a management controller according to certain embodiments of the present disclosure.

FIG. 2 schematically depicts a management controller of the system according to certain embodiments of the present disclosure. As shown in FIG. 2, the management controller 130 includes a processor 132, a memory 134, a network interface card (NIC) 136, a UART 137, and a storage device 138. Further, the management controller 130 may include other hardware components and software components (not shown) to perform its corresponding tasks. Examples of these hardware and software components may include, but not limited to, other required memory, interfaces, buses, Input/Output (I/O) modules and peripheral devices.

The processor 132 is configured to control operation of the management controller 130. In certain embodiments, the processor 132 may be a central processing unit (CPU). The processor 132 can execute any computer executable code or instructions, such as the firmware 160 of the management controller 130 or other applications and instructions of the management controller 130. In certain embodiments, the management controller 130 may run on more than one processor, such as two processors, four processors, eight processors, or any suitable number of processors.

The memory 134 can be a volatile memory, such as the random-access memory (RAM), for storing the data and information during the operation of the management controller 130. In certain embodiments, the memory 134 may be a volatile memory array. In certain embodiments, the management controller 130 may run on more than one memory 134.

The NIC 136 is a network interface, which functions as a point of interconnection for the management controller 130 with the remote computing devices 150 or any other device through the LAN 140 or other networks. In certain embodiments, the NIC 136 may be implemented by hardware and/or software components, and does not necessarily have a physical form. In certain embodiments, the management controller 130 may include more than one NIC 136 to be connectable to multiple different networks.

The UART 137 is a device to provide serial communications over multiple serial ports, such that the management controller 130 may be connectable to the nodes (e.g., the blades 120) via the serial communications provided by the UART 137. Specifically, each of the nodes may have a corresponding UART, such that the UART 137 of the management controller 130 may be connected to the UART of each node. In certain embodiments, the UART 137 may be an integrated circuit (IC) chip. In certain embodiments, the management controller 130 may include more than one UART 137 to provide multiple serial communication means.

The storage device 138 is a non-volatile data storage media for storing the applications of the management controller 130. Examples of the storage device 136 may include non-volatile memory such as flash memory, memory cards, USB drives, hard drives, floppy disks, optical drives, or any other types of data storage devices. In certain embodiments, the management controller 130 may have multiple storage devices 138, which may be identical storage devices or different types of storage devices, and the firmware 160 and other applications of the management controller 130 may be stored in one or more of the storage devices 138 of the management controller 130. In certain embodiments, the storage device 138 may store other applications independent from the firmware 160.

The firmware 160 stored in the storage device 138 may include computer executable code or instructions executable at the processor 132, and the computer executable code or instructions may include a plurality of modules to collectively form the firmware 160. As shown in FIG. 2, the modules of the firmware 160 may include, without being limited to: a management module 162, a SOL control module 164, a UART driver module 166, a network control module 168, and a data store 169. In certain embodiments, each of the modules of the firmware 160 may further include sub-modules. Alternatively, in certain embodiments, some or all of the modules of the firmware 180 may be combined to form a single module.

The management module 162 is a core module of the firmware 160 for performing management functions of the management controller 130. In certain embodiments, the management module 162 is configured to monitoring the various nodes and other features of the server blade system 110, such as the blades 120 and other components of the server blade system 110.

The SOL control module 164 is a module to establish and control the SOL sessions. In certain embodiments, when the management controller 130 receives a SOL request from a remote computing device 150 to establish a SOL session to access a specific node of the nodes (e.g., the blades 120) via one of the UART ports, the SOL control module 164 may check the information of the SOL request and establish a corresponding SOL session based on the information. Specifically, the SOL request may include information of a specific node to which the SOL session is connected, and a specific UART port to be used by the SOL session. In response to the SOL request, the SOL control module 164 retrieves the information of the specific UART port, and determines whether the specific UART port identified by the SOL request is available to establish the SOL session. If the SOL control module 164 determines that the specific UART port is available, the SOL control module 164 may establish the SOL session between the specific node identified by the SOL request and the remote computing device 150 sending the SOL request. On the other hand, if the SOL control module 164 determines that the specific UART port is unavailable (e.g., an existing SOL session is using the specific UART port), the SOL control module 164 may generate a denial message, and send the denial message to the remote computing device 150 sending the SOL request.

The UART driver module 166 is a module to configure and handle the UART ports of the UART 137. In particular, the UART driver module 166 may configure a plurality of UART ports for the nodes (e.g., the blades 120) of the server blade system 110, such that the UART ports may be available to establish the SOL sessions. In other words, the management controller 130 is connectable to each of the nodes via one of the UART ports for establishing the SOL sessions. In certain embodiments, the configuration of the UART ports may be performed when the management controller 130 is initiated. In certain embodiments, the UART driver module 166 may configure four UART ports, allowing the management controller 130 to establish at most four SOL sessions concurrently. Once the UART ports are configured, the UART driver module 166 may be used to handle UART interrupt requests in the SOL sessions, in order to reduce the system loading.

The network control module 168 is a network communication module controlling the incoming and outgoing signals via the NIC 136. In certain embodiments, the network control module 168 is used to configure a network port used for the network communication with the LAN 140 via the NIC 136. For example, a User Datagram Protocol (UDP) port 623 may be used as the network port 623, such that any incoming and outgoing data via the LAN 140 is received and transmitted through the UDP port 623.

The data store 169 is a database which stores information of the management controller 130. In certain embodiments, the information stored in the data store 169 may include configuration data of the UART ports, configuration data of the UDP port, and information of the SOL sessions being established. In certain embodiments, when multiple SOL sessions are concurrently established, the information of each of the SOL sessions may be stored independently in the data store 169.

Each of the remote computing devices 150 is a computing device which may be communicatively connected to the management controller 130 remotely through the LAN 140. In certain embodiments, each of the remote computing devices 150 may be a general purpose computer, a specialized computer, a server, a mobile device such as a laptop computer, a smartphone or a tablet, or any other types of computing device. In certain embodiments, the system 100 may include multiple remote computing devices 150. In certain embodiments, a user, such as an administrator of the system 100, may operate one of the remote computing devices 150 to communicate with the management controller 130 in order to establish a SOL session to one of the nodes of the server blade system 110.

Figure 3:
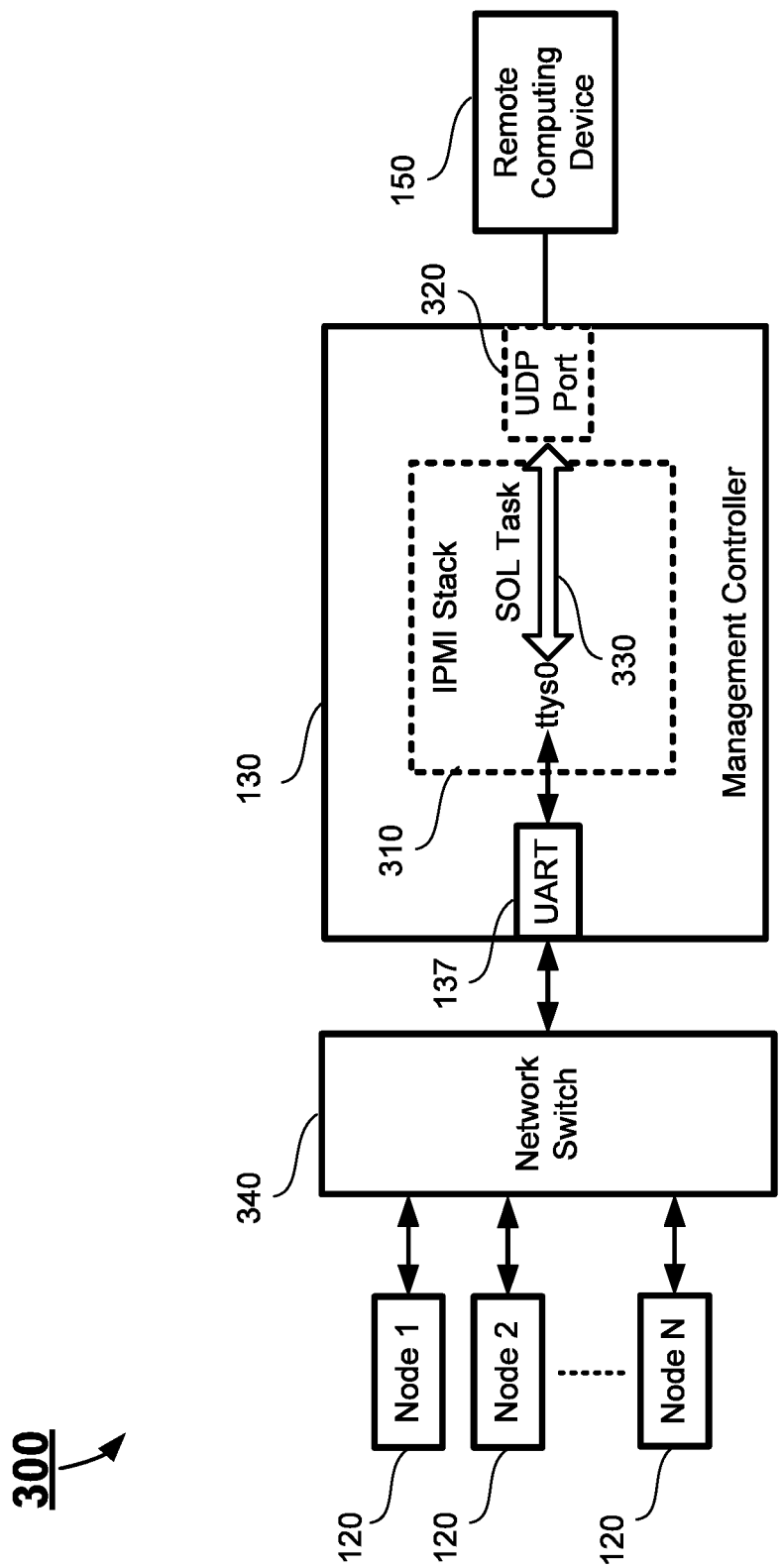
FIG. 3 schematically depicts providing a single SOL session between a remote computing device and multiple nodes using a network switch according to certain embodiments of the present disclosure.

FIG. 3 schematically depicts providing a single SOL session between a remote computing device and multiple nodes using a network switch according to certain embodiments of the present disclosure. In particular, FIG. 3 shows an existing system 300, which supports only one single SOL session between a remote computing device and one of the nodes. As shown in FIG. 3, the remote computing device 150 may be connected to the management controller 130 through the UDP port 320 (i.e., the network port), and requests to establish a SOL session. For example, the UDP port 320 may be port 623. Since the existing system only support one single SOL session, the UART 137 may provide only one UART port. In this case, the IPMI stack 310 of the management controller 130 may establish a SOL task 330, which is connected to the UART 137 through a teletype 0 (ttys0), and then connected to a destination node 120 through the only UART port of the UART 137. Since the system 300 include multiple nodes 120, a network switch 340 is required for the system 300, such that the SOL task may be connected to any of the nodes 120, including node 1, node 2, . . . node N.

Figure 4:
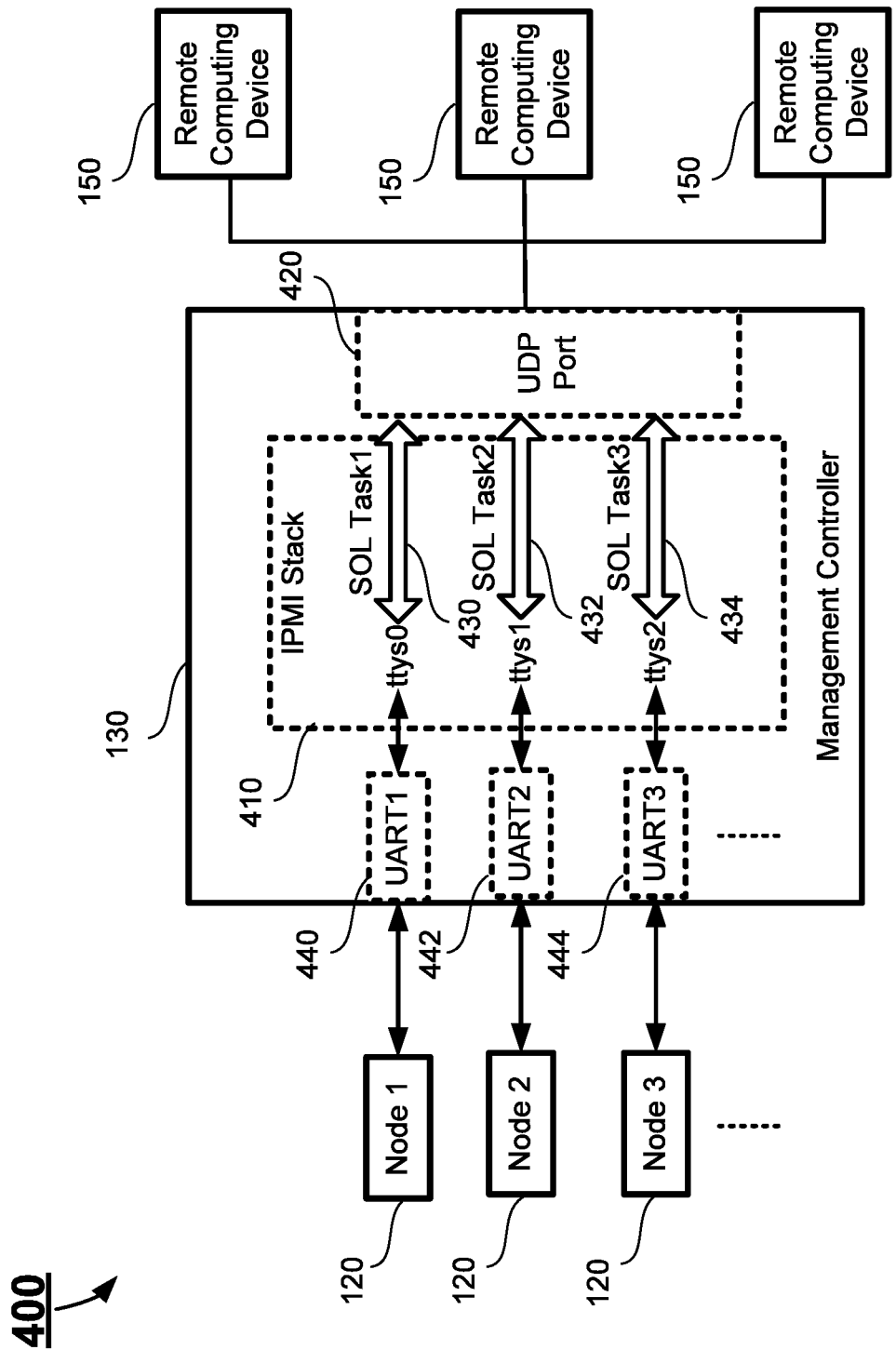
FIG. 4 schematically depicts providing multiple SOL sessions between the remote computing devices and the nodes according to certain embodiments of the present disclosure.

In comparison, by configuring multiple UART ports such that the management controller 130 may be connectable to the nodes 120 via one of the UART ports, the management controller 130 may support multiple SOL sessions. FIG. 4 schematically depicts providing multiple SOL sessions between the remote computing devices and the nodes according to certain embodiments of the present disclosure. In particular, FIG. 4 shows a system 400, which supports multiple IPMI SOL sessions between the remote computing devices 150 and the nodes (i.e., the blades) 120. As shown in FIG. 4, each of the remote computing devices 150 may be connected to the management controller 130 through the UDP port 320 (i.e., the network port), and requests to establish a SOL session. For example, the UDP port 320 may be port 623. Since the system 400 supports multiple SOL sessions, the UART 137 may provide multiple UART ports. For example, FIG. 4 shows that three UART ports are provided, including a UART1 440, a UART2 442 and a UART3 444. In this case, the IPMI stack 410 of the management controller 130 may establish three concurrent SOL task 430, 432 and 434, which may be respectively connected to the corresponding UART ports through different teletypes (ttys0, ttys1 and ttys2), and then connected to the corresponding nodes 120 through the UART ports 440, 442 and 444. In this case, the system 440 does not need a network switch.

As described in the embodiments above, all of the connections are using standard network based communication between the IPMI application tool and the embedded management controller. The SOL session information or attributes of each activated SOL session is stored independently in the data store of the management controller. The management stack code uses the attributes of the particular session to identify the particular SOL connection and the particular UART port. In this case, the embedded management controller may transmit the data between the terminals (i.e., the remote computing devices) and the nodes (i.e., the blades or servers).

Figure 5:
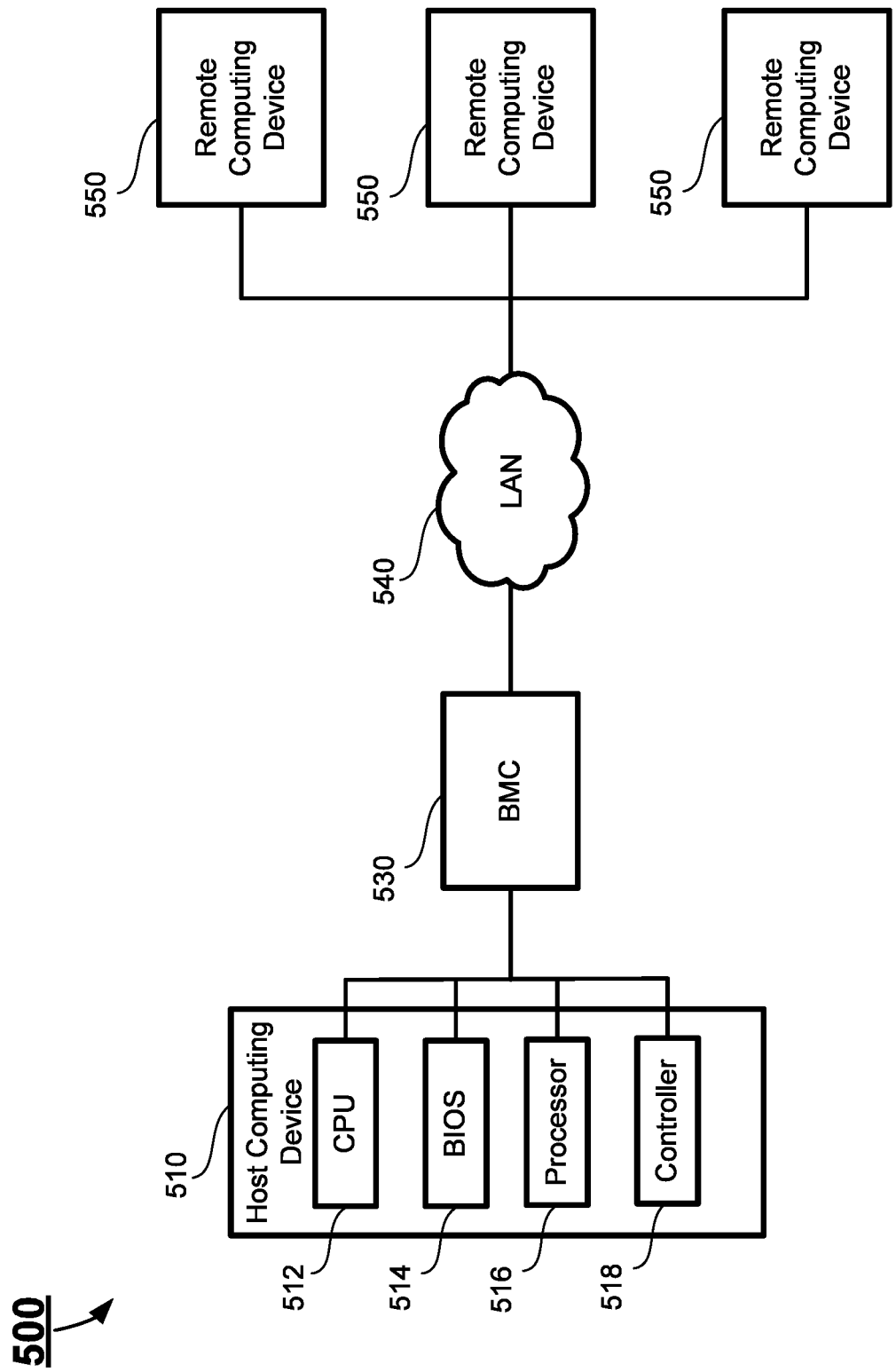
FIG. 5 schematically depicts a system according to certain embodiments of the present disclosure.

In the embodiments as shown in FIGS. 1-4, the nodes are the blades 120 of the server blade system 110, and the management controller 130 is a chassis management controller. However, as described above, any other types of management controller that manage multiple nodes may be used to implement the invention. For example, FIG. 5 schematically depicts a system according to certain embodiments of the present disclosure. As shown in FIG. 5, the system 500 includes a host computing device 510, which includes a plurality of nodes, including a CPU 512, a BIOS chip 514, a processor 516 and a controller 518, and a management controller 530. In this case, the management controller 530 is a BMC, which is used to manage and monitor the nodes of the host computing device 510.

Figure 6:
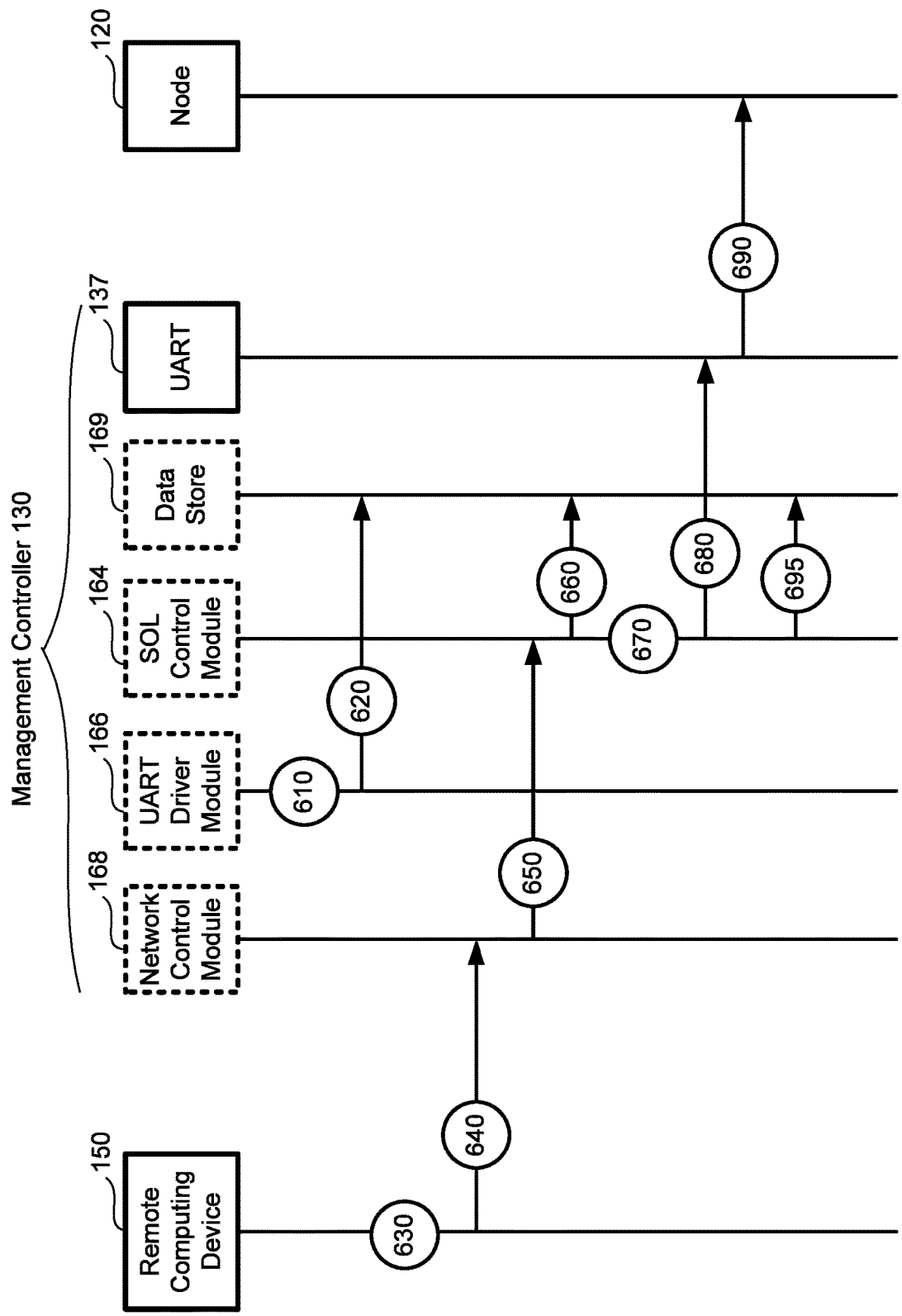
FIG. 6 schematically depicts a flowchart of establishing one of the multiple IPMI SOL sessions in a management controller according to certain embodiments of the present disclosure.

FIG. 6 schematically depicts a flowchart of establishing one of the multiple IPMI SOL sessions in a management controller according to certain embodiments of the present disclosure. In certain embodiments, the method as shown in FIG. 6 may be implemented on the management controller as shown in FIG. 2, which may be used in any of the systems as shown in FIGS. 1 and 5. Specifically, the method as shown in FIG. 6 merely describes creating one SOL session between one remote computing device and one node. However, it should be understood by the person of ordinary skill in the art that multiple IPMI SOL sessions may be established and co-exist. It should be particularly noted that, unless otherwise stated in the present disclosure, the steps of the method may be arranged in a different sequential order, and are thus not limited to the sequential order as shown in FIG. 6.

As shown in FIG. 6, at procedure 610, the UART driver module 166 is executed to configure a plurality of UART ports for a plurality of nodes 120, such that the management controller 130 is communicatively connectable to each of the nodes 120 respectively via one of the UART ports. At procedure 620, the UART driver module 166 stores the information of the UART ports in the data store 169.

At procedure 630, at a remote computing device 150, a user (e.g., an administrator) may generate a SOL request to establish a SOL session to access a specific node 120 via one of the UART ports. In particular, the SOL request includes the information of the specific node 120 and the information of the UART port to be used by the SOL session. It should be noted that multiple users may, at any time, respectively operate the remote computing devices 150 to generate multiple different SOL requests to access different nodes 120 via different UART ports. At procedure 640, the remote computing device 150 sends the SOL request to the management controller 130.

At the management controller 130, upon receiving the SOL request, at procedure 650, the network control module 168 forwards the SOL request received from the remote computing device 150 to the SOL control module 164. At procedure 660, the SOL control module 164 checks the information stored in the data store 169, and at procedure 670, the SOL control module 164 determines, based on the information stored in the data store 169, whether the specific UART port identified by the SOL request is available (i.e., whether the UART port is used by any existing SOL session). If the SOL control module 164 determines that the specific UART port is unavailable (e.g., an existing SOL session is using the specific UART port), the SOL control module 164 may generate a denial message, and send the denial message to the remote computing device 150 sending the SOL request.

If the SOL control module 164 determines that the specific UART port is available, the SOL control module 164 may establish the SOL session between the specific node identified by the SOL request and the remote computing device 150 sending the SOL request. At procedure 680, the SOL control module 164 may send the SOL request to the UART via the specific UART port. At procedure 690, the SOL request is forwarded to the specific node 120 identified by the SOL request. Thus, the SOL session is established between the remote computing device 150 and the specific node 120 via the specific UART port 150. At procedure 695, the SOL control module 164 stores the information of the SOL session in the data store 169. It should be noted that, when multiple SOL sessions are established between the remote computing devices 150 and the nodes 120 via multiple UART ports, the information of each of the SOL sessions are stored independently in the data store 169.

Figure 7:
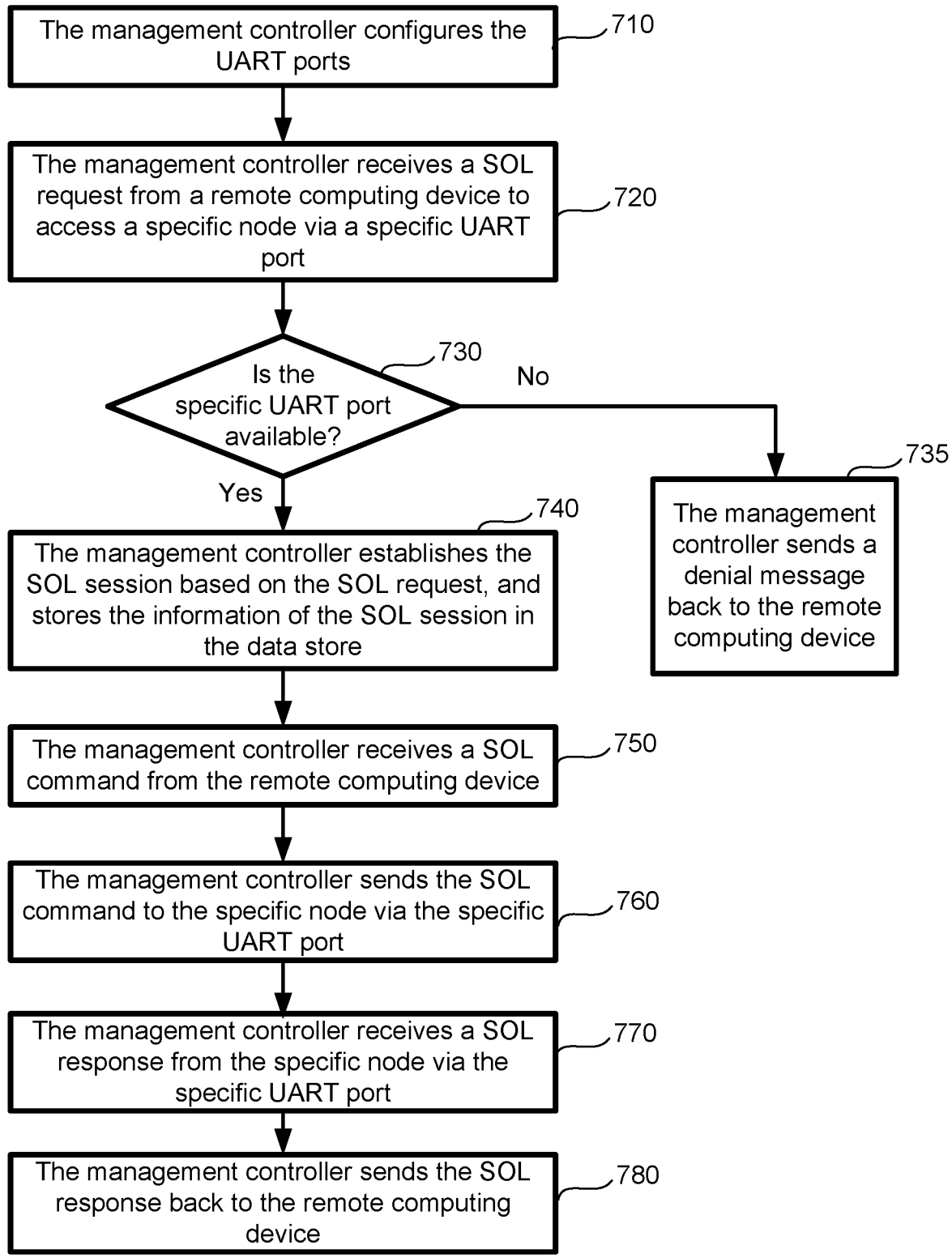
FIG. 7 schematically depicts a flowchart of a method for providing and supporting multiple IPMI SOL sessions in a management controller according to certain embodiments of the present disclosure.

In another aspect, the present disclosure relates to a method for providing and supporting multiple IPMI SOL sessions in a management controller. FIG. 7 schematically depicts a flowchart of a method for providing and supporting multiple IPMI SOL sessions in a management controller according to certain embodiments of the present disclosure. In certain embodiments, the method as shown in FIG. 7 may be implemented on a system as shown in FIG. 1 or 5. It should be particularly noted that, unless otherwise stated in the present disclosure, the steps of the method may be arranged in a different sequential order, and are thus not limited to the sequential order as shown in FIG. 7.

As shown in FIG. 7, at procedure 710, the management controller 130 configures the UART ports for the nodes 120. In certain embodiments, four UART ports are configured such that at most four SOL sessions may be established.

At procedure 720, the management controller 130 receives a SOL request from a remote computing device 150 to access a specific node 120 via a specific UART port. At procedure 730, the management controller 130 determines, based on the information stored in the data store 139, whether the specific UART port is available (i.e., whether the UART port is used by any existing SOL session). If the management controller 130 determines that the specific UART port is unavailable (e.g., an existing SOL session is using the specific UART port), at procedure 735, the management controller 130 may generate a denial message, and send the denial message to the remote computing device 150 sending the SOL request.

If the management controller 130 determines that the specific UART port is available, at procedure 740, the management controller 130 establishes the SOL session based on the SOL request, and stores the information of the SOL session in the data store 169.

Once the SOL session between the remote computing device 150 and the specific node 120 is established, at procedure 750, the management controller 130 may receive a SOL command from the remote computing device 150. In response, at procedure 760, the management controller 130 sends the SOL command to the specific node 120 via the specific UART port. Thus, the specific node 120 may process with the SOL command.

At procedure 770, the management controller 130 may receive a SOL response from the specific node via the specific UART port, where the SOL response is in response to the SOL command. At procedure 780, the management controller 130 sends the SOL response back to the remote computing device 150.

In another aspect, the present disclosure relates to a non-transitory computer readable medium storing computer executable code. In certain embodiments, the computer executable code may be the firmware 160 stored in the storage device 138 as described above. The computer executable code, when being executed, may perform one of the methods described above. In certain embodiments, the non-transitory computer readable medium may include, but not limited to, the storage device 138 of the management controller 130 as described above, or any other storage media of the management controller 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a management controller, comprising a processor and a non-volatile memory storing computer executable code; and
   at least one remote computing device communicatively connected to the management controller via a local area network (LAN);
   wherein the computer executable code, when executed at the processor, is configured to:
      configure a plurality of serial ports for a plurality of nodes, wherein the management controller is communicatively connectable to each of the nodes respectively via one of the serial ports;
      receive, from one of the at least one remote computing device via the LAN, a serial over LAN (SOL) request to establish a SOL session to access a specific node of the nodes via one of the serial ports;
      in response to the SOL request, establish the SOL session between the specific node and the remote computing device sending the SOL request; and
      when a plurality of the SOL sessions is established between the at least one remote computing device and the plurality of nodes, store information of each of the SOL sessions independently.

2. The system of claim 1, wherein the management controller is a chassis management controller, and each of the nodes is a blade server managed by the chassis management controller.

3. The system of claim 1, wherein the management controller is a baseboard management controller (BMC), and each of the nodes is a processor or a controller of a host computing device communicatively connected to the BMC.

4. The system of claim 1, wherein the serial ports are respectively configured under a universal asynchronous receiver/transmitter (UART) format.

5. The system of claim 4, wherein the serial ports comprise four UART ports, allowing the management controller to establish at most four of the SOL sessions concurrently.

6. The system of claim 1, wherein the SOL request comprises information to identify one of the serial ports to be used for the SOL session, and the computer executable code is configured to establish the SOL session by:
   in response to receiving the SOL request, determining whether the serial port identified by the SOL request is available to establish the SOL session; and
   in response to determining the serial port to be available, establishing the SOL session using the serial port identified by the SOL request.

7. The system of claim 6, wherein the computer executable code is further configured to:
   in response to establishing the SOL session, receiving a SOL command from the remote computing device sending the SOL request via the LAN; and
   sending the SOL command to the specific node via the serial port used for the SOL session.

8. The system of claim 7, wherein the computer executable code is further configured to:
   receiving a SOL response from the specific node via the serial port used for the SOL session, wherein the specific node is configured to generate the SOL response in response to the SOL command; and
   sending the SOL response to the remote computing device sending the SOL request via the LAN.

9. The system of claim 6, wherein the computer executable code is further configured to:
   in response to determining the serial port to be unavailable to establish the SOL session, send a denial message to the remote computing device sending the SOL request via the LAN.

10. A method for providing multiple Intelligent Platform Management Interface (IPMI) serial over local area network (SOL) sessions in a management controller, comprising:
    configuring, by the management controller, a plurality of serial ports for a plurality of nodes, wherein the management controller is communicatively connectable to each of the nodes respectively via one of the serial ports;
    receiving, by the management controller from one of at least one remote computing device via a local area network (LAN), a SOL request to establish a SOL session to access a specific node of the nodes via one of the serial ports;
    in response to the SOL request, establishing, by the management controller, the SOL session between the specific node and the remote computing device sending the SOL request; and
    when a plurality of the SOL sessions is established between the at least one remote computing device and the plurality of nodes, storing, by the management controller, information of each of the SOL sessions independently.

11. The method of claim 10, wherein the management controller is a chassis management controller, and each of the nodes is a blade server managed by the chassis management controller.

12. The method of claim 10, wherein the management controller is a baseboard management controller (BMC), and each of the nodes is a processor or a controller of a host computing device communicatively connected to the BMC.

13. The method of claim 10, wherein the serial ports are respectively configured under a universal asynchronous receiver/transmitter (UART) format, and the serial ports comprise four UART ports, allowing the management controller to establish at most four of the SOL sessions concurrently.

14. The method of claim 10, wherein the SOL request comprises information to identify one of the serial ports to be used for the SOL session, and the step of establishing the SOL session comprises:
  in response to receiving the SOL request, determining whether the serial port identified by the SOL request is available to establish the SOL session; and
  in response to determining the serial port to be available, establishing the SOL session using the serial port identified by the SOL request.

15. The method of claim 14, further comprising:
  in response to establishing the SOL session, receiving, by the management controller, a SOL command from the remote computing device sending the SOL request via the LAN;
  sending, by the management controller, the SOL command to the specific node via the serial port used for the SOL session;
  receiving, by the management controller, a SOL response from the specific node via the serial port used for the SOL session, wherein the specific node is configured to generate the SOL response in response to the SOL command; and
  sending, by the management controller, the SOL response to the remote computing device sending the SOL request via the LAN.

16. A non-transitory computer readable medium storing computer executable code, wherein the computer executable code, when executed at a processor of a management controller, is configured to:
  configure a plurality of serial ports for a plurality of nodes, wherein the management controller is communicatively connectable to each of the nodes respectively via one of the serial ports;
  receive, from one of at least one remote computing device via a local area network (LAN), a serial over LAN (SOL) request to establish a SOL session to access a specific node of the nodes via one of the serial ports;
  in response to the SOL request, establish the SOL session between the specific node and the remote computing device sending the SOL request; and
  when a plurality of the SOL sessions is established between the at least one remote computing device and the plurality of nodes, store information of each of the SOL sessions independently.

17. The non-transitory computer readable medium of claim 16, wherein the management controller is a chassis management controller, and each of the nodes is a blade server managed by the chassis management controller.

18. The non-transitory computer readable medium of claim 16, wherein the serial ports are respectively configured under a universal asynchronous receiver/transmitter (UART) format, and the serial ports comprise four UART ports, allowing the management controller to establish at most four of the SOL sessions concurrently.

19. The non-transitory computer readable medium of claim 16, wherein the SOL request comprises information to identify one of the serial ports to be used for the SOL session, and the computer executable code is configured to establish the SOL session by:
  in response to receiving the SOL request, determining whether the serial port identified by the SOL request is available to establish the SOL session; and
  in response to determining the serial port to be available, establishing the SOL session using the serial port identified by the SOL request.

20. The non-transitory computer readable medium of claim 19, wherein the computer executable code is further configured to:
  in response to establishing the SOL session, receive a SOL command from the remote computing device sending the SOL request via the LAN;
  send the SOL command to the specific node via the serial port used for the SOL session;
  receive a SOL response from the specific node via the serial port used for the SOL session, wherein the specific node is configured to generate the SOL response in response to the SOL command; and
  send the SOL response to the remote computing device sending the SOL request via the LAN.

* * * * *